(12) United States Patent
Shimazu (10) Patent No.: US 8,792,604 B2
(45) Date of Patent: Jul. 29, 2014

(54) XENON OSCILLATION PREDICTION METHOD AND COMPUTER PROGRAM FOR XENON OSCILLATION PREDICTION

(75) Inventor: Yoichiro Shimazu, Hokkaido (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 885 days.

(21) Appl. No.: 12/595,744

(22) PCT Filed: Apr. 30, 2008

(86) PCT No.: PCT/JP2008/058263
§ 371 (c)(1),
(2), (4) Date: Oct. 13, 2009

(87) PCT Pub. No.: WO2008/139933
PCT Pub. Date: Nov. 20, 2008

(65) Prior Publication Data
US 2010/0142666 A1 Jun. 10, 2010

(30) Foreign Application Priority Data
May 10, 2007 (JP) ................................ 2007-126029

(51) Int. Cl.
*G21C 7/36* (2006.01)
*G21C 7/00* (2006.01)

(52) U.S. Cl.
CPC ....................... *G21C 7/00* (2013.01)
USPC ........... 376/218; 376/207; 376/215; 376/216; 376/217

(58) Field of Classification Search
USPC .................. 376/207, 215, 216, 217, 218, 260
See application file for complete search history.

(56) References Cited

U.S. PATENT DOCUMENTS

| 4,582,669 A | 4/1986 | Watts et al. |
| 4,642,213 A | 2/1987 | Impink, Jr. |

FOREIGN PATENT DOCUMENTS

| JP | 02-183196 A | 7/1990 | |
| JP | 7-104092 A | * 4/1995 | ............. G21C 17/00 |

(Continued)

OTHER PUBLICATIONS

Supplementary European Search Report dated Nov. 25, 2011, issued in corresponding European Patent Application No. 08740931.4.

(Continued)

*Primary Examiner* — Jack W Keith
*Assistant Examiner* — Marshall O'Connor
(74) *Attorney, Agent, or Firm* — Westerman, Hattori, Daniels & Adrian, LLP (57) ABSTRACT

To predict xenon oscillation at the present time and later. For this purpose, as an axial offset of a power distribution of a reactor is represented by AOp, an axial offset of a power distribution based on xenon distribution is represented by AOx, and an axial offset of a power distribution based on an iodine distribution is represented by AOi, a parameter DAOpx (=AOp−AOx) and a parameter DAOix(=AOi−AOx) are described by a relational expression of a trigonometric function and an exponential function using an angular frequency of xenon oscillation. Next, phases with respect to initial values of the parameters DAOpx and DAOix are obtained (Step S101). The parameter DAOpx and the parameter DAOix expressed by the obtained phase and a coefficient of the relational expression obtained from this phase are plotted on an X coordinate and a Y coordinate, respectively. A locus at the present time and later is predicted using the locus obtained in this manner (Step S102), and a timing of extinguishing the xenon oscillation is predicted (Step S103).

3 Claims, 4 Drawing Sheets

(56) References Cited

FOREIGN PATENT DOCUMENTS

| | | | |
|---|---|---|---|
| JP | 07-104092 | A | 4/1995 |
| JP | 07-140290 | A | 6/1995 |
| JP | 2000-121779 | A | 4/2000 |
| JP | 3202430 | B2 | 8/2001 |

OTHER PUBLICATIONS

International Search Report of PCT/JP2008/058263, mailing date of May 27, 2008.

Yoichiro Shimazu, et al., "Monitoring and Control of Radial Xenon Oscillation in PWRs by a Three-Radial-Offset Concept," Journal of Nuclear Science and Technology, Feb. 25, 2007, p. 155-162, vol. 44, No. 2.

Yoichiro Shimazu, "Xenon Oscillation Control in Large PWRs Using a Characteristic Ellipse Trajectory Drawn by Three Axial Offsets," Journal of Nuclear Science and Technology, Apr. 1, 2008, p. 257-262, vol. 45, No. 4.

Notification on the Grant of Patent Right for Invention dated Jul. 5, 2012, issued in corresponding Chinese Patent Application No. 200880015537.8, with English translation (2 pages).

Notification for Patent Registration Formalities dated Jul. 5, 2012, issued in corresponding Chinese Patent Application No. 200880015537.8, with English translation (2 pages).

European Office Action dated Oct. 12, 2012, issued in corresponding European Patent Application No. 08 740 931.4 (33 pages).

* cited by examiner

XENON OSCILLATION PREDICTION METHOD AND COMPUTER PROGRAM FOR XENON OSCILLATION PREDICTION

TECHNICAL FIELD

The present invention relates to prediction of power distribution oscillation (hereinafter, "xenon oscillation") generated in a reactor core caused by oscillation of space distribution of xenon that can be generated in a reactor.

BACKGROUND ART

In a reactor, xenon directly generated as a result of a nuclear fission reaction and xenon generated by decay of iodine generated as a result of the nuclear fission reaction have a strong neutron absorption ability. For this reason, a phenomenon called xenon oscillation in which power distribution shape in a reactor core is periodically varied is generated. When this phenomenon is generated, the deviation in power distribution in the reactor is increased, and the maximum linear power density of nuclear fuel constituting a reactor core is increased. To avoid this deviation in power distribution in the reactor, it is necessary to suppress xenon oscillation if it is generated. As a method of suppressing xenon oscillation, Patent Document 1 discloses a method of suppressing the xenon oscillation using characteristics of an elliptic locus that are specific to xenon oscillation.

Patent Document 1: Japanese Patent No. 3202430, paragraphs 0017 to 0022, FIG. 1

DISCLOSURE OF INVENTION

Problem to be Solved by the Invention

According to the technique disclosed in Patent Document 1, it is possible to obtain information concerning the xenon oscillation at present. However, the technique disclosed in Patent Document 1 cannot predict the state of the xenon oscillation in the future, and there is room for improvement in this respect.

An object of the present invention is to provide a xenon oscillation prediction method and a computer program for xenon oscillation prediction capable of realizing at least one of prediction of a state of xenon oscillation at the present time and later and prediction of a state of xenon oscillation up to an arbitrary specified time by tracking back in time.

Means for Solving Problem

According to an aspect of the present invention, xenon oscillation prediction method includes: describing, by a relational expression between a trigonometric function using an angular frequency of xenon oscillation and an exponential function, a parameter DAOpx(=AOp−AOx) and a parameter DAOix(=AOi−AOx), in which AOp represents an axial offset of a powr distribution of a reactor, AOx represents an axial offset of a power distribution based on xenon distribution, and AOi represents an axial offset of a power distribution based on iodine distribution; obtaining a phase with respect to initial values of the parameter DAOpx and the parameter DAOix; obtaining a coefficient of the relational expression with respect to the initial values of the parameter DAOpx and the parameter DAOix; and predicting a state of xenon oscillation after the initial value, based on information of a locus obtained by plotting the parameter DAOpx and the parameter DAOix expressed, respectively on an X coordinate and a Y coordinate, by the relational expression described by the obtained phase and coefficient.

The parameter DAOpx represented by a difference between the axial offset AOp of a power distribution of the reactor and the axialoffset AOx of a power distribution based on xenon distribution, and the parameter DAOix represented by a difference between the axial offset AOi of a power distribution based on an iodine distribution and the axial offset AOp of a power distribution of the reactor are described by a relational expression between a trigonometric function using an angular frequency of the xenon oscillation and an exponential function. The xenon oscillation is predicted using the relational expression. Consequently, the locus of the xenon oscillation at the present time and later can be obtained, and thus the xenon oscillation at the present time and later can be predicted.

Advantageously, the xenon oscillation prediction method further includes: obtaining a first predicted locus obtained by plotting, respectively on the X coordinate and the Y coordinate, the parameter DAOpx and the parameter DAOix expressed by the relational expression with respect to the phases with respect to the initial values of the parameter DAOpx and the parameter DAOix and with respect to the initial values of the parameter DAOpx and the parameter DAOix; setting, as a control-rod returning operation point at which a returning operation of a control rod of the reactor is performed, coordinates that is moved in parallel along an X axis from a point of origin of X-Y coordinates by an amount corresponding to an operation amount of the control rod of the reactor when the control rod is operated, obtaining a second predicted locus obtained by inversely calculating time while plotting, respectively on the X coordinate and the Y coordinate, the parameter DAOpx and the parameter DAOix expressed by the relational expression described by a phase and a coefficient obtained by setting the control-rod returning operation point as an initial value; setting, as a third predicted locus, a locus obtained by moving the second predicted locus in parallel to the X axis such that the second predicted locus passes through the point of origin of the X-Y coordinates; and setting, as a control-rod operation point for operating the control rod, coordinates where the first predicted locus and the third predicted locus in the X-Y coordinates intersect with each other.

With this arrangement, when a movement amount of the control rod of the reactor is limited, an insertion amount and a pull-out amount of the control rod into and out from the reactor core are made equal to each other within the limited range, and the shortest timing at which the xenon oscillation is extinguished can be swiftly and accurately predicted.

To achieve the objects described above, the computer program for xenon oscillation prediction according to the present invention causes a computer to perform the xenon oscillation prediction method. Accordingly, the xenon oscillation prediction method according to the present invention can be realized using a computer.

Effect of the Invention

According to the present invention, it is possible to realize at least one of prediction of the state of xenon oscillation at the present time and later and prediction of the state of xenon oscillation up to an arbitrary specified time by tracking back in time.

EXPLANATIONS OF LETTERS OR NUMERALS 1 reactor
2 pressure container
3 reactor core
4 control rod
5 connection rod
6 control-rod control device
7 upper ex-core neutron-flux detector
8 lower ex-core neutron-flux detector
9 neutron-flux measuring device
10 control device
11 display device
12 input device

BEST MODE(S) FOR CARRYING OUT THE INVENTION

The present invention will be explained below in detail with reference to the accompanying drawings. The invention is not limited to the best mode for carrying out the invention (hereinafter, "embodiment"). In addition, constituent elements in the embodiment include those that can be easily assumed by those skilled in the art, that are substantially equivalent, and that are in an equivalent scope.

An example in which the present invention is applied to xenon oscillation in a height direction of a reactor (that is, axial direction of a reactor) is explained below. However, the present invention can be also applied to xenon oscillation in a radial direction of a reactor. Xenon oscillation in the radial direction of a reactor is disclosed in a document 'Yoichiro SHIMAZU and Kenshiro TAKEDA, "Monitoring and Control of Radial Xenon Oscillation in PWRs by a Three-Radial-Offsets Concept", Journal of Nuclear Science and Technology, Vol. 44, No. 2, pp. 155-162, 2007', for example.

The present embodiment has a characteristic such that, by utilizing a fact that an elliptic locus that is distinctive for xenon oscillation can be expressed using simple trigonometric function and exponential function, an arbitrary point on an elliptic locus expressing xenon oscillation expressed on the X-Y coordinates is defined as an initial value, and a locus of later in time than the initial value is predicted.

Figure 1:
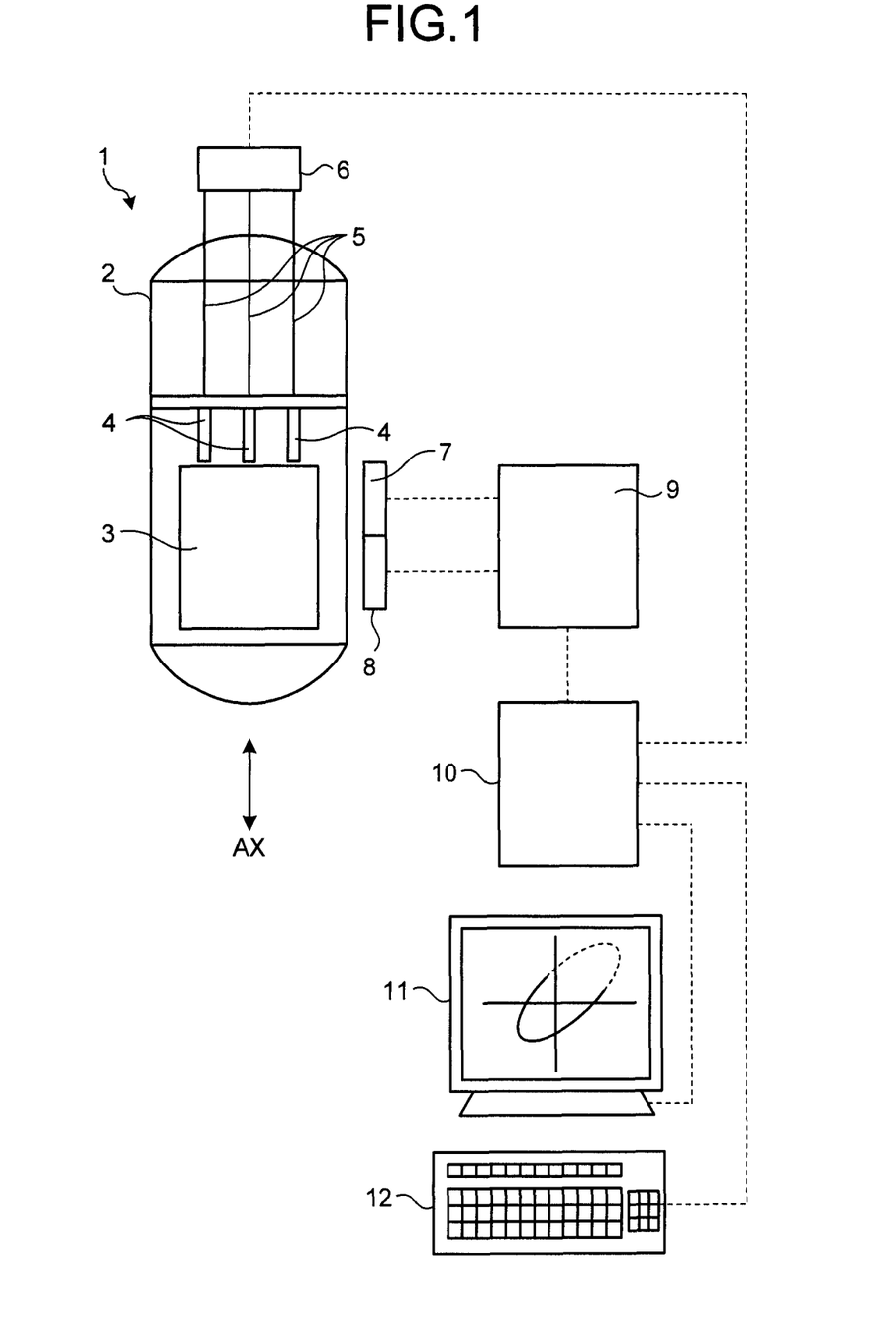
FIG. 1 is a conceptual diagram of an apparatus that realizes a xenon oscillation control method according to an embodiment of the present invention.

FIG. 1 is a conceptual diagram of an apparatus that realizes a xenon oscillation control method according to the present embodiment. A reactor 1 is a pressurized water reactor (PWR). The reactor 1 includes a reactor core 3 in a pressure container 2. The reactor 1 includes a plurality of control rods 4 to control a nuclear fission reaction of the reactor core. The control rods 4 are connected to each other through a control-rod control device 6 and connection rods 5. The control rods 4 are inserted into the reactor core 3 and taken out from the reactor core 3 by the control-rod control device 6. The control rods 4 are moved in parallel to a fuel rod constituting the reactor core 3. The moving direction of the control rod 4 and the longitudinal direction of the fuel rod are in parallel to an axis (that is, an axis of the reactor core 3) AX of the reactor 1. The reactor 1 includes an upper ex-core neutron-flux detector 7 and a lower ex-core neutron-flux detector 8. A direction in which gravity is applied is downward, and a direction opposite to the gravity applying direction is upward.

The upper ex-core neutron-flux detector 7 and the lower ex-core neutron-flux detector 8 each generate signals that are respectively proportional to an upper half power PT and a lower half power PB of the reactor core 3. These signals are input to a control device 10 through a neutron-flux measuring device 9, and the control device 10 predicts the xenon oscillation and controls the xenon oscillation. A display device 11 is connected to the control device 10, and a prediction result of the xenon oscillation is displayed on the display device 11. Further, an input device 12 is connected to the control device 10. Information necessary for predicting xenon oscillation and information necessary for controlling xenon oscillation are input to the control device 10 through the input device 12.

The xenon oscillation is generated by a fact that equilibrium concentration distribution of xenon and iodine that is its precursor determined by neutron flux distribution in the reactor core 3 and the concentration distribution of xenon and iodine in practice are different from each other. To control the xenon oscillation is equal to resolve contradiction between the neutron flux distribution, the xenon distribution, and the iodine distribution in the reactor core 3. In the pressurized water reactor, because it is a main subject to control xenon oscillation in the axial direction AX, xenon oscillation in the axial direction AX of the reactor 1 is explained below.

The axial direction power distribution of the pressurized water reactor can be expressed as follows: axial-direction power-distribution deviation (axial offset) AO=(reactor-core upper-half power−reactor-core lower-half power)/(reactor-core upper-half power+reactor-core lower-half power). Therefore, control of suppression of xenon oscillation can be achieved by controlling the axial offset. As axial offset based on xenon distribution is represented by AOx, axial offset based on iodine distribution is represented by AOi, and axial offst of power distribution of the reactor is represented by AOp, the xenon oscillation is suppressed under the condition of AOx=AOi=AOp.

Figure 2:
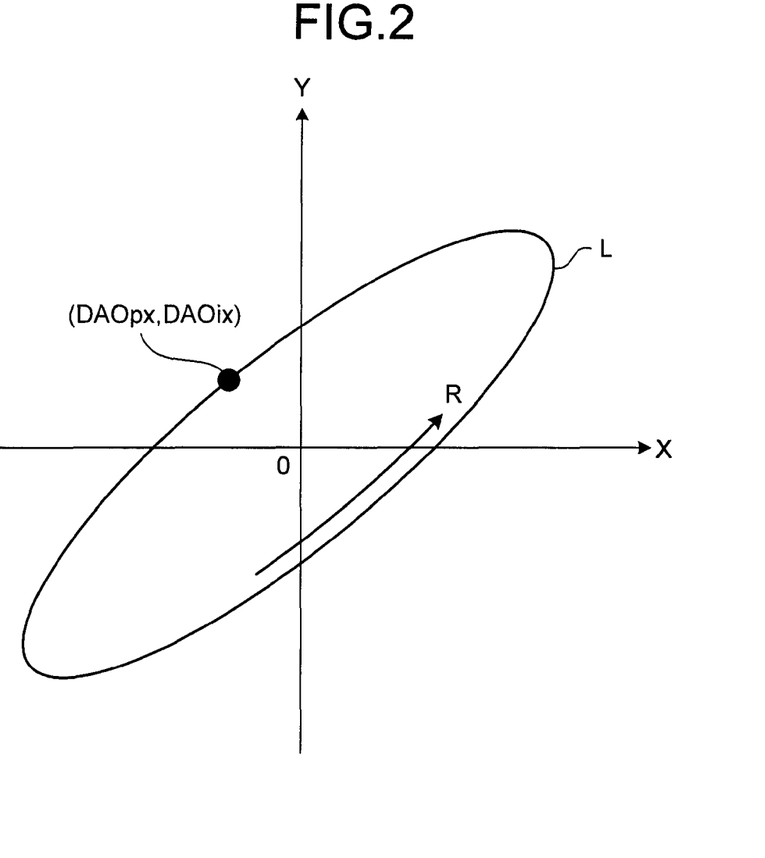
FIG. 2 is an explanatory diagram of a cycle indicating xenon oscillation.

FIG. 2 is an explanatory diagram of a cycle indicating the xenon oscillation. As a parameter DAOix=AOi−AOx and a parameter DAOpx=AOp−AOx, in the xenon oscillation, DAOpx is plotted on the X coordinate and DAOpx is plotted on the Y coordinate. Under this condition, a locus L of (DAOpx, DAOix) in the xenon oscillation becomes an ellipse as shown in FIG. 2. The locus L has the following characteristics.

(1) In simple xenon oscillation, the locus L of (DAOpx, DAOix) becomes a flat ellipse formed mainly in the first quadrant and the third quadrant around a point of origin (0, 0).

(2) A moving direction of the locus L of (DAOpx, DAOix) is the counterclockwise direction (direction of arrow R in FIG. 2), and the locus L makes a single orbit around the point of origin (0, 0) in one cycle of the xenon oscillation. Therefore, the moving speed on the ellipse becomes faster as separating away from a long diameter of the ellipse.

(3) When xenon oscillation is divergent oscillation, the ellipse becomes greater, and if xenon oscillation is convergent oscillation, the ellipse becomes small.

(4) The long diameter of the ellipse of the locus L of (DAOpx, DAOix) passes through the point of origin (0, 0) and the long diameter exists in the first quadrant and the third quadrant.

(5) Inclination of the long diameter of the locus L of (DAOpx, DAOix) is slightly varied depending on an operation condition of the reactor 1, and is about 36 degrees.

The behavior of the locus L of (DAOpx, DAOix) when the control rod 4 is arbitrarily moved and disturbance is generated while xenon oscillation is generated is as follows.

(6) When the control rods 4 are inserted into the reactor core 3, the locus L of (DAOpx, DAOix) moves to the negative side of the X axis.

(7) When the control rods 4 are pulled out from the reactor core 3, the locus L of (DAOpx, DAOix) moves to the positive side of the X axis.

(8) When the movement of the control rod 4 is stopped, the locus L of the (DAOpx, DAOix) moves in the same direction of the basic ellipse. That is, the locus L moves leftward and downward if the locus L is located above the long diameter of the ellipse, and the locus L moves rightward and upward if the locus L is located below the long diameter of the ellipse.

In the present embodiment, xenon oscillation is suppressed using the characteristics described above. Specifically, in a state where xenon oscillation is not generated, DAOpx=DAOix=0, that is, the locus L of (DAOpx, DAOix) is on the point of origin (0, 0). The locus L of (DAOpx, DAOix) on the X-Y coordinates is monitored, and if deviation from the point of origin (0, 0) is increased, the control rods 4 are operated such that the locus L of (DAOpx, DAOix) is guided toward the point of origin. A direction and an amount thereof can be determined while checking the locus L of (DAOpx, DAOix) on the X-Y coordinates. Specific operations are as follows.

When the locus L of (DAOpx, DAOix) at present is located on the right side of the point of origin (0, 0) of the X-Y coordinates and located below the long diameter, the control rods 4 are inserted into the reactor core 3 and the locus L of (DAOpx, DAOix) is moved leftward. At this time, it is possible to determine a subsequent moving direction of (DAOpx, DAOix) by stopping the locus L above or below the long diameter. It is possible to easily adjust the moving timing and the moving amount of the control rods 4 while checking the locus L of (DAOpx, DAOix), to guide the locus L of (DAOpx, DAOix) toward the point of origin (0, 0), and to suppress the xenon oscillation within a permissible range.

In the present embodiment, the locus L of (DAOpx, DAOix) is characterized such that the locus L of (DAOpx, DAOix) in the future is predicted from the locus L of (DAOpx, DAOix) at present, by using a fact that the locus L can be expressed analytically using a trigonometric function and an exponential function. When DAOpx=X(t) and DAOix=Y(t), X(t) can be expressed by the following equation (1), and Y(t) can be expressed by the following equation (2). In this manner, the locus L of (DAOpx, DAOix) can be expressed analytically by the relational expression using the trigonometric function and the exponential function. In the equations, "t" represents time. Further, $\omega$, $\phi p$, $r=b/a$, and $\lambda$ can be calculated from parameters expressing nuclear characteristics of the reactor 1. These parameters can be also determined from operation data when xenon oscillation of the reactor 1 is generated during an operation.

Figure 3:
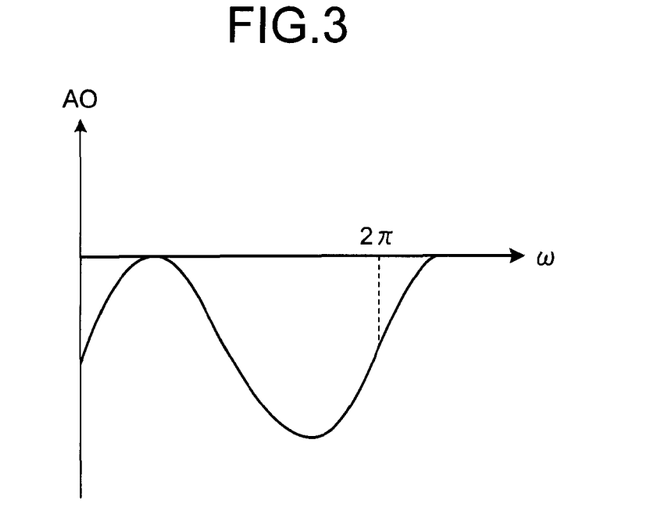
FIG. 3 is an explanatory diagram of AO (axial offset) when xenon oscillation is generated.

FIG. 3 is an explanatory diagram of AO (axial offset) when xenon oscillation is generated. The $\omega$ described above represents angular frequency, and when one cycle of xenon oscillation is represented by T, $T \times \omega = 2 \times \pi$ is established. That is, if one cycle of xenon oscillation (about 30 hours) is represented by T, the angular frequency $\omega$ can be obtained by $(2 \times \pi)/T$.

[Equation 1]

$$X(t) = a \times \cos(\omega \times t - \phi p) \times \exp[\lambda \times t] \quad (1)$$

[Equation 2]

$$Y(t) = b \times \sin(\omega \times t) \times \exp[\lambda \times t] \quad (2)$$

Figure 4:
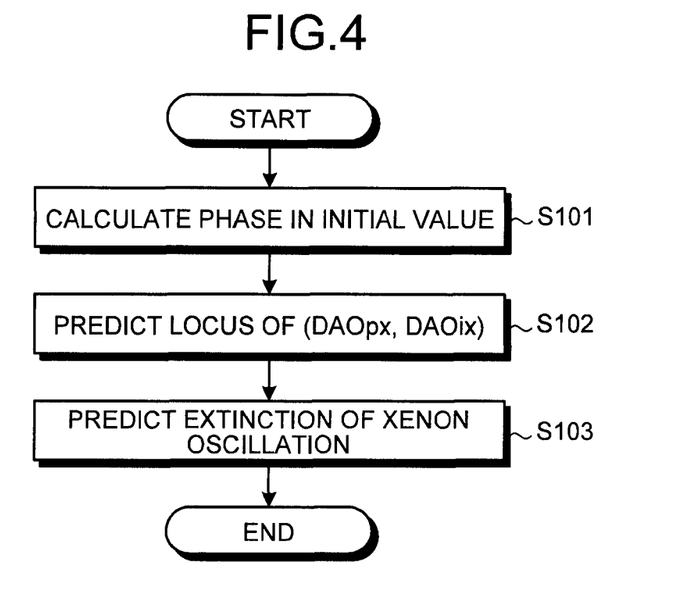
FIG. 4 is a flowchart of a procedure of a xenon oscillation prediction method according to the embodiment.

FIG. 4 is a flowchart of a procedure of the xenon oscillation prediction method according to the present embodiment. When xenon oscillation is generated, because the locus L of (DAOpx, DAOix) is always expressed by the equations (1) and (2), if an arbitrary initial value S(X, Y) is given, it is possible to calculate the subsequent locus L and to predict the xenon oscillation. In the xenon oscillation prediction method according to the present embodiment, a phase in the initial value is calculated first (Step S101). As $\phi 0$ is defined as an initial phase and t0 is defined as a time of the initial phase, the equation (1) is changed as equation (3) and the equation (2) is changed as equation (4). In the equations, X and Y are coordinates on the locus L on an X-Y plane.

[Equation 3]

$$X = a \times \cos(\phi 0 - \phi p) \times \exp[\lambda \times t0] \quad (3)$$

[Equation 4]

$$Y = b \times \sin(\phi 0) \times \exp[\lambda \times t0] \quad (4)$$

When $a \times \cos(\phi 0)$ is obtained from the equations (3) and (4), equation (5) is then established. When the above fact is organized using the equations (5) and (4), equation (6) is obtained, and equation (7) is obtained from the equation (6). $\phi 0$ obtained by the equation (7) is a phase of an initial value, that is, an initial phase $\phi 0$. When the initial phase $\phi 0$ is obtained, a coefficient a can be obtained by equation (8), and a coefficient b can be obtained by equation (9).

[Equation 5]

$$a \times \cos(\phi 0) = \frac{X - \sin(\phi p) \times Y/r}{\cos(\phi p)} \times \exp[-\lambda \times t0] \quad (5)$$

[Equation 6]

$$\frac{b \times \sin(\phi 0)}{a \times \cos(\phi 0)} = \frac{Y \times \cos(\phi 0)}{X - \sin(\phi 0) \times Y/r} = r \times \tan(\phi 0) \quad (6)$$

[Equation 7]

$$\phi 0 = \tan^{-1}\left\{\frac{Y \times \cos(\phi p)}{r \times X - Y \times \sin(\phi p)}\right\} \quad (7)$$

[Equation 8]

$$a = \frac{X}{\cos(\phi 0 - \phi p)} \times \exp[-\lambda \times t0] \quad (8)$$

[Equation 9]

$$b = \frac{Y}{\sin(\phi 0)} \times \exp[-\lambda \times t0] \quad (9)$$

When the initial phase $\phi 0$ and the coefficients a and b are obtained, a locus after the initial value (X, Y) can be obtained using equations (10) and (11). Therefore, it is possible to predict a locus of (DAOpx, DAOix) after the initial value (X, Y) using the initial phase $\phi 0$ and the equations (10) and (11)

(Step S102). That is, the parameter DAOpx is X(t) of the equation (10), and the parameter DAOix can be expressed by Y(t) of the equation (11). By varying time t in each of the equations (10) and (11), it is possible to obtain a locus of (DAOpx, DAOix) after the initial value S(X, Y). Positive variation (the future from the present time) and negative variation (the past from the present time) are included in the variation of time t.

When a coefficient a' is defined as $X/\cos(\phi 0-\phi p)$ and a coefficient b' is defined as $X/\sin(\phi 0)$, a becomes equal to a'×exp[−λ×t0] and b becomes equal to b'×exp[−λ×t0]. When they are used, the equations (10) and (11) becomes as shown in equations (12) and (13), respectively. Therefore, a locus of (DAOpx, DAOix) after the initial value S(X, Y) can be predicted using the equations (12) and (13) and the initial phase $\phi 0$. Extinction of xenon oscillation is predicted from a prediction result of a locus of (DAOpx, DAOix) after the initial value S(X, Y) (Step S103). An example of a technique for predicting extinction of xenon oscillation is explained next.

[Equation 10]

$$X(t)=a\times\cos(\phi 0+\omega\times t-\phi p)\times\exp[\lambda\times t]=DAOpx(t) \quad (10)$$

[Equation 11]

$$Y(t)=b\times\sin(\phi 0+\omega\times x\ \exp[\lambda\times t]=DAOix(t) \quad (11)$$

[Equation 12]

$$X(t)=a'\times\cos(\phi 0+\omega\times t-\phi p)\times\exp[\omega\times(t-t0)]=DAOpx(t) \quad (12)$$

[Equation 13]

$$Y(t)=b'\times\sin(\phi 0+\omega\times t)\times\exp[\lambda\times(t-t0)]=DAOix(t) \quad (13)$$

Figure 5:
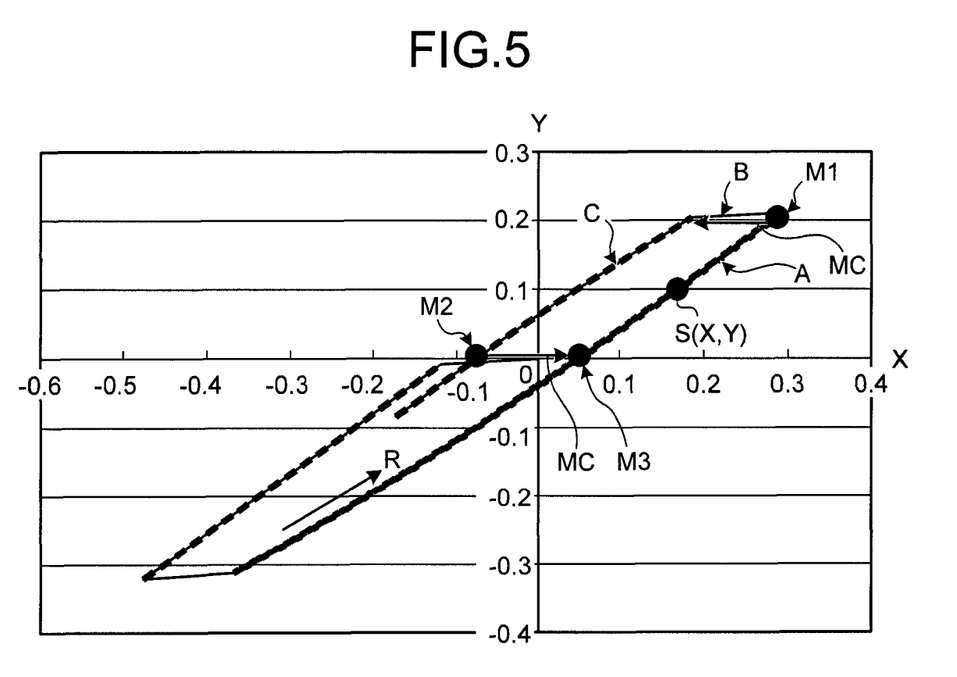
FIG. 5 is an explanatory diagram of an example of a technique for predicting extinction of xenon oscillation.
Figure 6:
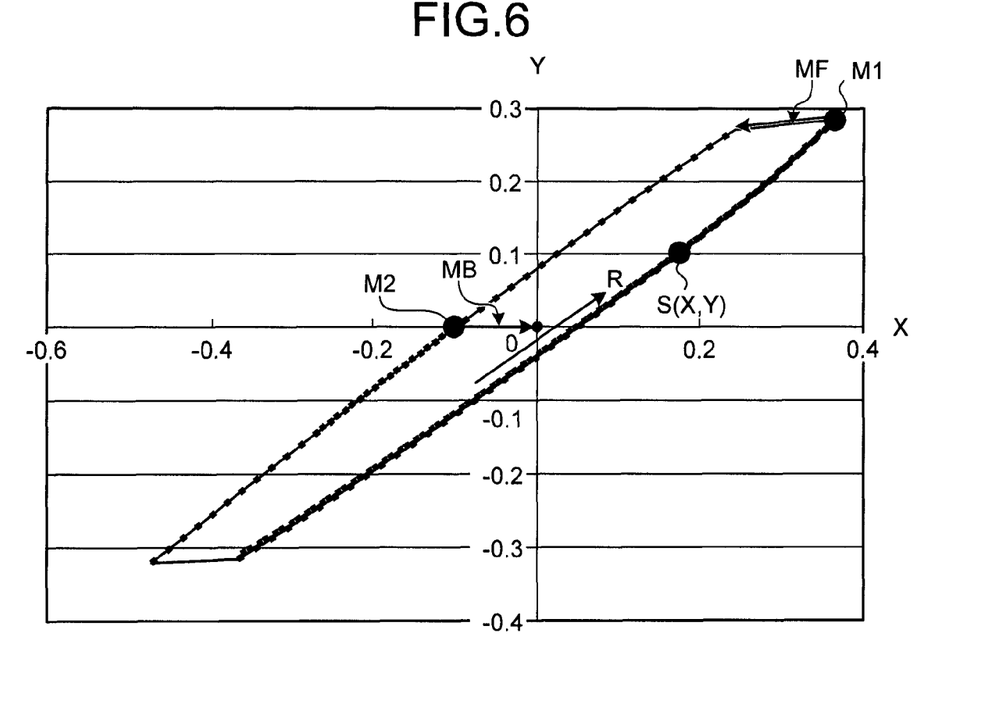
FIG. 6 is an explanatory diagram of an example of the technique for predicting extinction of xenon oscillation.

FIGS. 5 and 6 are explanatory diagrams of an example of a technique for predicting extinction of xenon oscillation. In the example shown in FIGS. 5 and 6, the strength of control, that is, a variation width (which is determined by an operation amount of the control rod 4) caused by an operation of the control rod 4 shown in FIG. 1 is designated. First, the initial phase $\phi 0$, the coefficient a and the coefficient b are determined from the initial value S(X, Y) using the technique described above, and a locus of (DAOpx, DAOix) from the initial value S(X, Y) to an arbitrary control-rod operation point M1 is predicted using the equations (10) and (11) (portion shown with A in FIG. 5).

The initial value (X, Y) can be obtained by the present (DAOpx, DAOix), that is, (AOp−AOx, AOi−AOx). The present (AOp−AOx, AOi−AOx) can be obtained from the present AOp, AOx, and AOi. The axial offset AOp of power distribution of the reactor can be obtained by equation (14), axial offset AOi of power distribution based on iodine distribution can be obtained by equation (15), and axial offset AOx of power distribution based on xenon distribution can be obtained by equation (16).

[Equation 14]

$$AOp = \frac{(PT - PB)}{(PT + PB)} \quad (14)$$

[Equation 15]

$$AOi = \frac{(IT - IB)}{(IT + IB)} \quad (15)$$

[Equation 16]

$$AOx = \frac{(Gi + Gx)\times\Sigma f\times(XT - XB)}{(Gi + Gx)\times\Sigma f\times(XT + XB) - 2\times\sigma a\times XT\times XB} \quad (16)$$

In the equations, PT represents a power of the reactor core upper half, PB represents a power of the reactor core lower half, IT represents an average iodine concentration of the reactor core upper half, IB represents an average iodine concentration of the lower half, XT represents an average xenon concentration of the reactor core upper half, XB represents an average xenon concentration of the lower half, Gi represents an iodine yield caused by nuclear fission, Gx represents a xenon yield caused by nuclear fission, Σf represents a macroscopic nuclear fission cross section, and σa represents a microscopic absorption cross section of xenon. The iodine distribution, the xenon distribution and the axial offset AOi of the power distribution based on the iodine concentration as results thereof, and the axial offset AOx of power distribution based on xenon distribution as results thereof can be obtained by successively integrating equations (17) to (20). In the equations, $\phi 0$ represents an average neutron flux at the time of rated power of the reactor 1, ki represents a decay constant of iodine, and kx represents a decay constant of xenon.

[Equation 17]

$$\frac{dIT}{dt} = Gi\times\Sigma f\times\Phi 0\times PT - ki\times IT \quad (17)$$

[Equation 18]

$$\frac{dIB}{dt} = Gi\times\Sigma f\times\Phi 0\times PB - ki\times IB \quad (18)$$

[Equation 19]

$$\frac{dXT}{dt} = Gi\times\Sigma f\times\Phi 0\times PT + ki\times IT - (\sigma a\times\Phi 0\times PT + kx)\times XT \quad (19)$$

[Equation 20]

$$\frac{dXB}{dt} = Gi\times\Sigma f\times\Phi 0\times PB + ki\times IB - (\sigma a\times\Phi 0\times PB + kx)\times XB \quad (20)$$

Next, an operation of the control rod 4 is performed at the control-rod operation point M1 (portion shown with B in FIG. 5), and an effect of the operation of the control rod 4 is given. At the control-rod operation point M1, an operation for inserting the control rods 4 into the reactor core 3 is performed. The effect of operation of the control rods 4 can be previously obtained by experiments or analysis. By giving the effect of operation of the control rods 4, a locus of (DAOpx, DAOix) after the operation of the control rods 4 is performed by the control-rod operation point M1 becomes a portion as indicated by C in FIG. 5.

Next, a point at which the locus of (DAOpx, DAOix) after the operation of the control rods 4 is performed by the control-rod operation point M1 intersects with the X axis is determined. This point is defined as a control-rod returning operation point M2, and in the control-rod returning operation point M2, the control rods 4 are pulled out from the reactor core 3 by the same amount as the insertion amount of the control rods 4 in the control-rod operation point M1, thereby determining whether the xenon oscillation can be extinguished. That is, in the control-rod returning operation point M2, the control rods 4 are pulled out from the reactor core 3 by the same amount as the insertion amount of the control rods 4, and with this operation, it is determined whether the locus of (DAOpx, DAOix) can be guided to the point of origin (0, 0).

In the example shown in FIG. 5, a magnitude of the control is denoted by MC, the control rods 4 are inserted into the reactor core, and the control rods 4 are pulled out from the reactor core 3 at the control-rod returning operation point M2 by the same amount as the operation amount of the control rod 4 at M1, that is, the control rods 4 are pulled out from the reactor core 3 to positions before the control rods 4 are inserted into the reactor core. With this arrangement, it is found that the coordinates after the control rods 4 are pulled out are as indicated by M3, and exceed the point of origin (0, 0). With this arrangement, it is found that the operation of the control rods 4 at the control-rod operation point M1 has been performed too early. In this case, the control-rod operation point M1 is delayed, or the magnitude of the control in the control-rod operation point M1, that is, the operation amount of the control rods 4 is changed. With this arrangement, the best condition for extinguishing the xenon oscillation is searched.

The search can be made within considerably short time by using a computer. A cycle of xenon oscillation is about 30 hours, and if this fact is taken into consideration, a search using the xenon oscillation prediction method of the present embodiment can be performed very easily. If the best condition for extinguishing xenon oscillation is search in this manner, a search result as shown in FIG. 6 can be obtained.

According to a search result shown in FIG. 6, in the control-rod operation point M1, a magnitude of the control is denoted by MF, the control rods 4 are inserted into the reactor core, and the control rods 4 are pulled out from the reactor core at the control-rod operation point M1 by the same amount as the operation amount of the control rod 4 at M1, that is, the control rods 4 are pulled out from the reactor core 3 to positions before the control rods 4 are inserted into the reactor core. That is, the control rods 4 are inserted into the reactor core 3 and pulled out from the reactor core 3 such that a magnitude MB of control at the control-rod returning operation point M2 becomes equal to MF (magnitude of control at the control-rod operation point M1). With this arrangement, the locus of (DAOpx, DAOix) can be guided to the point of origin (0, 0), and xenon oscillation can be extinguished.

Figure 7:
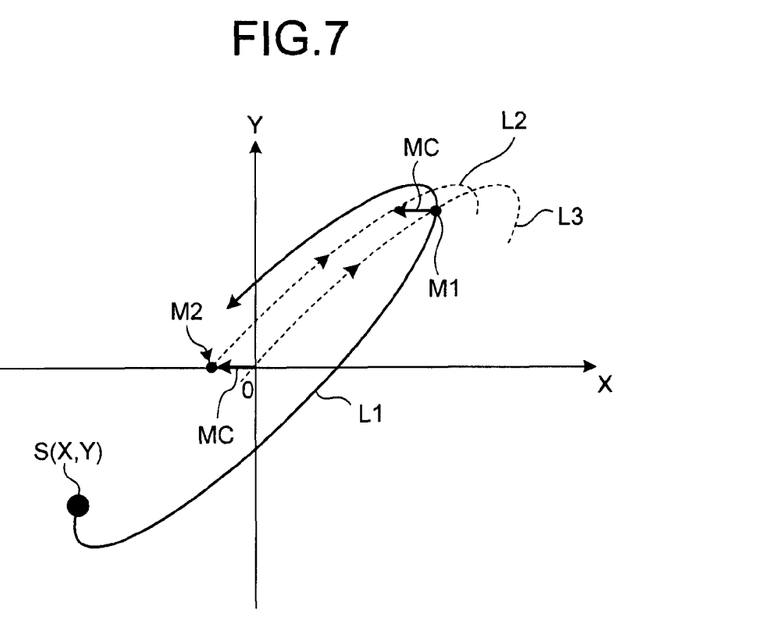
FIG. 7 is an explanatory diagram of another example of the technique for predicting extinction of xenon oscillation.

FIG. 7 is an explanatory diagram of another example of the technique for predicting the extinction of xenon oscillation. This technique is effective when the operation amount of the control rods 4 is limited. First, in a state where xenon oscillation is generated, initial phases $\phi 0$, a, and b are obtained by the technique described above from an initial value (X, Y), and a locus of (DAOpx, DAOix) is predicted using the equations (10) and (11). The locus obtained in this manner is L1 in FIG. 7 (first predicted locus).

Coordinates that moved in parallel into a negative direction of the X axis from the point of origin (0, 0) by the operation amount MC of the control rods 4 are obtained. The coordinates become the control-rod returning operation point M2 at which the returning operation of the control rods is performed. When the control-rod returning operation point M2 is obtained, the control-rod returning operation point M2 is defined as the initial value, and the initial phases $\phi 0$, a, and b are obtained by the technique described above. The locus of (DAOpx, DAOix) is predicted using the equations (10) and (11). In this case, however, time t is inversely calculated to predict the locus of (DAOpx, DAOix), and the locus of (DAOpx, DAOix) is predicted using the equations (10) and (11). The locus obtained in this manner is L2 in FIG. 7 (second predicted locus).

Next, the obtained locus L2 is moved in parallel to the X axis and into the positive direction of the X axis to pass through the point of origin (0, 0). The locus obtained in this manner is L3 shown in FIG. 7 (third predicted locus). A coordinate at which the locus L3 and the locus L1 intersect with each other is the control-rod operation point M1. The control rods 4 are inserted into the reactor core 3 at the control-rod operation point M1. The operation amount of the control rods 4 at this time is the above operation amount MC of the control rods 4. The control rods 4 are inserted into the reactor core 3 at the control-rod operation point M1 that is determined in this manner, and the control rods 4 are pulled out from the reactor core 3 by MC at the control-rod returning operation point M2. With this arrangement, xenon oscillation can be extinguished. By making the insertion amount and the pull-out amount of the control rods 4 equal to each other, variation of a state of the reactor core 3 can be reduced to a very small value, and this is advantageous for the operation of the reactor 1.

Because a locus of xenon oscillation can be expressed by simple equations using a trigonometric function and an exponential function, the locus of xenon oscillation can be easily moved in parallel, and xenon oscillation at the present time and later can be easily predicted. With this arrangement, it is possible to easily predict a timing of control for extinguishing xenon oscillation within the shortest time, and a timing of control for making the insertion amount and the pull-out amount of the control rod 4 equal to each other and for extinguishing xenon oscillation. As a result, when a moving amount of the control rods of the reactor is limited, the insertion amount and the pull-out amount of the control rods into the reactor core can be made equal to each other within the limited conditions, and the shortest timing at which xenon oscillation is extinguished can be swiftly and accurately predicted.

According to the present embodiment, the parameter DAOpx represented by the difference between the axial offset AOp of the power distribution of the reactor and the axial offset AOx of the power distribution based on the xenon distribution, and the parameter DAOix represented by the difference between the axial offset AOi of the power distribution based on the iodine distribution and the axialoffset AOx of the power distribution based on the xenon distribution are described by the relational expression of the trigonometric function using the angular frequency of the xenon oscillation. The xenon oscillation is predicted using the relational expression. With this arrangement, because it is possible to obtain a locus of the xenon oscillation at the present time and later, the xenon oscillation at the present time and later can be predicted. As a result, it is possible to obtain accurate information such as a moving direction and a moving amount of the control rod for extinguishing the xenon oscillation. In the present embodiment, because the xenon oscillation at the present time and later can swiftly be predicted, it is possible to obtain accurate information such as the moving direction and the moving amount of the control rod for extinguishing the xenon oscillation. As a result, xenon oscillation of a reactor can be swiftly and reliably suppressed.

Industrial Applicability

As described above, the xenon oscillation prediction method and the computer program for xenon oscillation prediction according to the present invention are useful for controlling a reactor, and particularly suitable to predict xenon oscillation at the present time and later.

The invention claimed is:

1. A xenon oscillation prediction method comprising:

describing, by relational expressions between a trigonometric function and an exponential function using an angular frequency of xenon oscillation, a parameter DAOpx(=AOp−AOx) and a parameter DAOix(=AOi−AOx), in which AOp is an axial offset of a power distribution of a reactor, AOx is an axial offset of a power distribution casued by xenon distribution, and AOi is an axial offset of a power distribution caused by iodine distribution, as $DAOpx = X(t) = a \times \cos(\omega \times t - \phi p) \times \exp[\lambda \times t]$ and $DAOix = Y(t) = b \times \sin(\omega \times t) \times \exp[\lambda \times t]$, where coefficients $\omega$, $\phi p$, a, b and $\lambda$ are determined from parameters expressing nuclear characteristics of the reactor or from operation data;

obtaining a phase with respect to initial values of the parameter DAOpx and the parameter DAOix;

obtaining the coefficients of the relational expressions with respect to the initial values of the parameter DAOpx and the parameter DAOix; and predicting a state of xenon oscillation after the initial values, information of a locus obtained by plotting the parameter DAOpx and the parameter DAOix expressed, respectively on an X coordinate and a Y coordinate, by the relational expressions described by the obtained phase and coefficients.

2. The xenon oscillation prediction method according to claim 1, further comprising:

obtaining a first predicted locus by plotting, respectively on the X coordinate and the Y coordinate, the parameter DAOpx and the parameter DAOix with respect to the phases obtained from the initial values of the parameter DAOpx and the parameter DAOix and with respect to the initial values of the parameter DAOpx and the parameter DAOix;

obtaining a control-rod returning operation point at which a returning operation of pulling out a control rod of a core of the reactor is performed, by obtaining coordinates that are moved in parallel along the X axis from a point of origin of X-Y coordinates by an amount corresponding to an operation amount of the control rod of the reactor when the control rod is operated, obtaining a second predicted locus by changing time (t) to negative side for the relational expressions while plotting, respectively on the X coordinate and the Y coordinate, the parameter DAOpx and the parameter DAOix described by a phase and coefficients obtained by setting the control-rod returning operation point as an initial value;

setting, as a third predicted locus, a locus obtained by moving the second predicted locus parallel to the X axis toward a positive direction such that the second predicted locus passes through the point of origin of the X-Y coordinates; and obtaining a control-rod operation point for operating the control rod, by obtaining coordinates where the first predicted locus and the third predicted locus in the X-Y coordinates intersect with each other.

3. A computer readable medium containing computer executable instructions for executing the xenon oscillation prediction method according to claim 1.

* * * * *